(12) United States Patent
Berg

(10) Patent No.: US 11,303,457 B2
(45) Date of Patent: *Apr. 12, 2022

(54) TECHNIQUES FOR PROCESSING TRANSACTIONS OF ORDER-DEPENDENT BLOCKCHAIN PROTOCOLS

(71) Applicant: Protoblock, Inc., Walnut Creek, CA (US)

(72) Inventor: Yehuda Jay Berg, Walnut Creek, CA (US)

(73) Assignee: Protoblock, Inc., Walnut Creek, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/834,979

(22) Filed: Mar. 30, 2020

(65) Prior Publication Data

US 2020/0389323 A1 Dec. 10, 2020

Related U.S. Application Data

(63) Continuation of application No. 15/494,277, filed on Apr. 21, 2017, now Pat. No. 10,608,825.

(60) Provisional application No. 62/325,647, filed on Apr. 21, 2016, provisional application No. 62/325,637, filed on Apr. 21, 2016, provisional application No. 62/325,607, filed on Apr. 21, 2016.

(51) Int. Cl.
| | | |
|---|---|---|
| *H04L 29/06* | (2006.01) |
| *H04L 9/32* | (2006.01) |
| *G06Q 30/08* | (2012.01) |
| *G06Q 20/38* | (2012.01) |
| *H04L 9/14* | (2006.01) |
| *H04L 9/06* | (2006.01) |

(52) U.S. Cl.
CPC ....... *H04L 9/3255* (2013.01); *G06Q 20/3825* (2013.01); *G06Q 30/08* (2013.01); *H04L 9/14* (2013.01); *H04L 9/3239* (2013.01); *H04L 9/3247* (2013.01); *H04L 9/0637* (2013.01); *H04L 2209/38* (2013.01); *H04L 2209/56* (2013.01)

(58) Field of Classification Search
None
See application file for complete search history.

(56) References Cited

U.S. PATENT DOCUMENTS

| | | | |
|---|---|---|---|
| 9,875,510 B1 * | 1/2018 | Kasper | H04L 67/104 |
| 2016/0218879 A1 | 7/2016 | Ferrin | |
| 2017/0075941 A1 | 3/2017 | Finlow-bates | |
| 2017/0180134 A1 * | 6/2017 | King | H04L 63/0853 |
| 2019/0173667 A1 * | 6/2019 | Wang | G06F 21/64 |

* cited by examiner

*Primary Examiner* — Andrew J Steinle
(74) *Attorney, Agent, or Firm* — Perkins Coie LLP; Brian R. Coleman; Alberto Araiza

(57) ABSTRACT

Disclosed embodiments include a server included in a network. The server is operable to determine a next block signer in a blockchain. The server includes processor(s) and memory containing instructions executable by the processor(s). As such, the server is operable to receive bids from nodes of the network and to select a bid from the received bids. The selected bid is provided by a node from the nodes of the network. The server is further operable to grant a right to sign a next block in a blockchain to the node that provided the selected bid.

20 Claims, 4 Drawing Sheets

TECHNIQUES FOR PROCESSING TRANSACTIONS OF ORDER-DEPENDENT BLOCKCHAIN PROTOCOLS

CROSS-REFERENCE TO RELATED APPLICATIONS

This application is a continuation of U.S. patent application Ser. No. 15/494,277, filed Apr. 21, 2017, which claims the benefit of U.S. Provisional Patent Application No. 62/325,647, filed on Apr. 21, 2016, and claims the benefit of U.S. Provisional Patent Application No. 62/325,637, filed on Apr. 21, 2016, and claims the benefit of U.S. Provisional Patent Application No. 62/325,607, filed on Apr. 21, 2016, and the subject matter thereof is incorporated hereby by reference in their entireties.

TECHNICAL FIELD

The disclosed teachings relate generally to a distributed autonomous platform. More particularly, the disclosed teachings relate to decentralized exchanges in a distributed autonomous platform.

BACKGROUND

Distributed computing has emerged as a promising solution to the inherent drawbacks of standalone computing. Bitcoin is an example of a distributed autonomous cryptocurrency system that provides a pragmatic engineered solution for arriving at a consensus in the face of trust and timing problems encountered in distributed networks. Decentralized exchanges for trading securities can also be implemented in a distributed network. Such exchanges can only support securities of a size too small to be practical compared to conventional centralized exchanges. As such, centralized exchanges remain the only practical means for trading securities.

DETAILED DESCRIPTION

Figure 1:
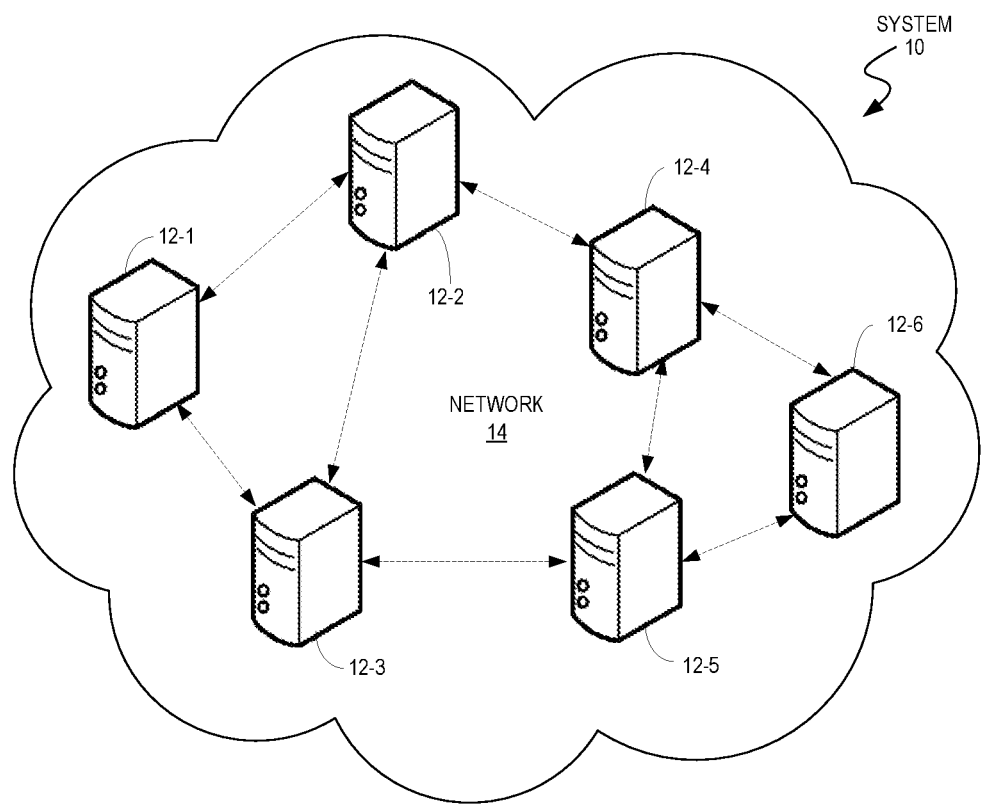
FIG. 1 is a block diagram of a distributed computer network according to some embodiments of the present disclosure.

The embodiments set forth below represent the necessary information to enable those skilled in the art to practice the embodiments, and illustrate the best mode of practicing the embodiments. Upon reading the following description in light of the accompanying figures, those skilled in the art will understand the concepts of the disclosure and will recognize applications of these concepts that are not particularly addressed herein. It should be understood that these concepts and applications fall within the scope of the disclosure and the accompanying claims.

The purpose of terminology used herein is only for describing embodiments and is not intended to limit the scope of the disclosure. Where context permits, words using the singular or plural form may also include the plural or singular form, respectively.

As used herein, unless specifically stated otherwise, terms such as "processing," "computing," "calculating," "determining," "displaying," "generating" or the like, refer to actions and processes of a computer or similar electronic computing device that manipulates and transforms data represented as physical (electronic) quantities within the computer's memory or registers into other data similarly represented as physical quantities within the computer's memory, registers, or other such storage medium, transmission, or display devices.

As used herein, the terms "connected," "coupled," or variants thereof, refer to any connection or coupling, either direct or indirect, between two or more elements. The coupling or connection between the elements can be physical, logical, or a combination thereof.

Existing distributed exchanges lack a centralized exchange that includes a single matching engine that clears all orders. Instead, each node of the network has its own copy of a matching engine. Each matching engine keeps track of all orders in structures known as "market-depth" and/or "limit-order-book." A depth of market measure provides an indication of the liquidity and depth for that security or currency. A limit-order-book provides a guarantee that the top priority order is executed before other orders in the book, and before other orders at equal or worse price held or submitted by other traders.

When a match occurs, orders are marked as filled, and both sides of the trades have their positions changed. However, problems associated with blockchain-based decentralized exchanges include every node having transactions recorded in a different order due to the asynchronous nature of the distributed network. The true order of events is known only after the transactions are inside a block. Further, traders never know their true positions until after the next block. That is, traders know their positions when their own nodes show that their orders were matched and filled; however, this may not occur when the orders of a transaction change in the next block. Moreover, traders are incentivized to fork a chain of a blockchain during major market moves if their current order of transactions is a particularly bad trade and they would incur a large trading loss as a result. The disclosed embodiments overcome these drawbacks.

The disclosed embodiments include a decentralized exchange implemented in a blockchain. The embodiments include mechanisms for overcoming existing problems of trust and timing with distributed exchanges. Solutions include a centralized server that timestamps all orders and broadcasts the timestamped orders to the nodes of the network. Each node maintains a matching engine to place and fill any orders but relies on the timestamping from the centralized server to validate an ordering of transactions.

In some embodiments, the decentralized exchange may implement a "GammaCoin" blockchain that avoids the need for without centralized timestamping. The disclosed technology includes a bidding process used to select a next block signer. Specifically, nodes (of market participants) bid to sign blocks of the blockchain. The right to sign a block may be given to the highest bidder. A bid may be determined based on a variety of factors and considerations. For example, each node can calculate a best/worst order of events and bid accordingly. A node may be willing to pay up to an amount to avoid loss and/or ensure profits. Other considerations may include desired positions and market liquidity. New trading strategies can emerge based on the knowledge that participants can pay to change the order of a limit-order-book. These strategies can replace high-frequency trading strategies of centralized exchanges.

FIG. 1 illustrates a system 10 that includes a network 14 of interconnected nodes 12 according to some embodiments of the present disclosure. Embodiments of the distributed autonomous platform may be included in one or more of the nodes 12. As such, the network 14 can perform processes of a blockchain-based decentralized exchange. The network 14 may include a combination of private, public, wired, or wireless portions. Data communicated over the network 14 may be encrypted or unencrypted at various locations or portions of the network 14. Each node 12 may include combinations of hardware and/or software to process data, perform functions, communicate over the network 14, and the like.

Nodes 12 may include computing devices such as servers, desktop or laptop computers (e.g., APPLE MACBOOK, LENOVO 440), handheld mobile devices (e.g., APPLE iPHONE, SAMSUNG GALAXY, MICROSOFT SURFACE), and any other electronic computing device. Any component of the network 14 may include a processor, memory or storage, a network transceiver, a display, operating system and application software (e.g., for providing a user interface), and the like. Other components, hardware, and/or software included in the network 14 that are well known to persons skilled in the art are not shown or discussed herein for brevity.

The network 14 may utilize public-key cryptography to securely process transactions over the network 14. Public-key cryptography uses asymmetric key algorithms, where a key used by one party to perform either encryption or decryption is not the same as the key used by another in the counterpart operation. Each party has a pair of cryptographic keys: a public encryption key and a private decryption key. For example, a key pair used for digital signatures consists of a private signing key and a public verification key. The public key may be widely distributed, while the private key is known only to its proprietor. The keys are related mathematically, but the parameters are chosen so that calculating the private key from the public key is unfeasible. Moreover, the keys could be expressed in various formats, including hexadecimal format.

The disclosed decentralized exchange is described in the context of a gaming platform merely to aid in understanding. Gaming inherently involves unpredictable events and outcomes. For example, some participants of a game may have successfully projected outcomes that defied expectations of most participants. The disclosed platform equates successful projections and skill. For example, participants of fantasy football play by drafting a team and then submitting a lineup each week. Some leagues allow trading players, but the high-stakes public leagues do not. There can also be weekly games and a professional expert service industry that supports the gaming environment. These decisions involve making projections of events and outcomes of games.

The disclosed embodiments relate to distributed blockchain matching engines. In the context of using gaming tokens, there is a full futures market on each NFL player's weekly results. Blockchain participants can buy and sell futures contracts, using gaming tokens as the currency for settlement and profit and loss.

The gaming platform enables buying or selling a player's season production with gaming tokens. For example, the platform enables buying or selling futures contracts on NFL player performance. If a participant wants to "sell" a fantasy player in existing gaming environments, the participant could (a) trade the player (if owned), (b) not draft the player, (c) blog or tweet about the player, and/or (d) not pick the player in weekly games.

Projections about the outcome of a game (i.e., "level 1" projections) can be made up until the game commences. For example, during each week of the fantasy season, up until kickoff, projections can be made. All that is needed to make projections is a valid name identifier for the participant. Projections can be made by signing a pointProjection event and sending it to the network of the gaming platform. Every timely projection included in the blockchain is eligible for a payout. Once a block containing the consensus results is received, a deterministic distribution algorithm is run to determine the payouts to each participant.

A distribution algorithm can be used to determine payouts to each participant according to some embodiments of the present disclosure. The distribution algorithm can also be expressed mathematically. Let R equal actual results of a game and let $p_n$ equal projections made by each participant n. The difference between results and projections is $d(p)=|R-p|$. The average difference is $\overline{D}=\Sigma_n|R-p_n|$.

Projections below average or 100% or more off a mark are filtered out, as $$F(d) = \begin{cases} 0 & \text{if } d > \overline{D} \text{ or } d > r \\ 1 & \text{otherwise} \end{cases}.$$

A unit payout X distributes more gaming tokens for better predictions as $$X = \frac{R}{(R - d(p_n)) \times F(d(p_n))}.$$

Lastly, an award function A(p) determines how many gaming points are awarded for each projection, which can be multiplied by a factor such as 100 for gaming tokens. The award function can be expressed as $A(p)=X \times (R-d(p)) \times F(d(p))$. Any leftover points, L, due to poor projections or no projections can be distributed to a block signer, where $L=R-\Sigma_n A(p_n)$.

A proof-of-work may be required in order for a participant to obtain a name identifier (e.g., fantasy name), which mitigates the vulnerability of the gaming platform to a Sybil attack. Otherwise there would be no cost to making projections. As such, an attacker could write a program to create millions of participant identifiers in an attempt to control the gaming platform of the network.

The gaming platform may include different ways to keep score (e.g., number of gaming tokens) and participant rankings. The values of scores and participant rankings can be used to determine signers of next blocks. The values could be kept based on skill, data, stake, and time. Skill refers to a gross total of gaming tokens earned, which can only increase and are not transferrable. Data refers to data feed rankings, which cannot be less than skill and can be assigned to an agent. Stake refers to a net balance of present gaming tokens that is not transferrable. Time refers to time-sync rankings, which cannot be less than the stake and can be assigned to an agent. In the context of futures exchanges, stake balance is the currency used for trading, margin, and settlement. The time-balances let a user participate in centralized time stamping operations.

In some embodiments, each participant identifier may assign a peer to be an agent of data and time. The skill and stake values of the assigner can be added to the data and time rankings of the agent, respectively. If a participant identifier assigns herself as her own agent, she becomes a volunteer and must be willing to do the same for the entire network of the gaming platform. By default, agents are assigned by default consensus, the agents being decided by skill and stake consensus proofs.

If a single agent represents a majority of the network, that agent can become an oracle, and a central point of control for critical time periods, such as during live games. As such, agents are essentially participants appointed by a consensus of the network. Free market economic forces would choose the most capable agents.

The disclosed gaming platform includes a state machine. In particular, the underlying protocol can change its behavior based on its current state. There are also different blockchain and event or transaction rules. A transition to a different state is accomplished when a block of a blockchain is signed. The particular proof required to sign a block also depends on a transition context.

The gaming platform may include a variety of event types. A transaction that transfers gaming tokens is only one of many event types. In contrast to Bitcoin, the transfer transaction is not necessarily a core feature of the disclosed gaming platform. Instead, for example, point projections and name identifier mining can be core features of the gaming platform.

Examples of events, in order of significance, include:
nameProof: contains proof-of-work data sent by new participants to claim their identifiers, and is signed by an/the identifier;
pointProjection: contains the playerID, week, and point projection, and is sent and signed by an/the identifier;
dataTransition: contains game results, draft results, player metadata or schedule data, is sent by a data agent, and is signed by consensus of skill;
timeTransition: contains trading session, exchange events, or any time-ordered data, is sent by a time agent, and is signed by consensus of stake;
exchangeOrder: contains limit order, price, quantity, playerID. The exchangeOrder is first created and signed by fantasy name, then stamped and signed by time agent; and
transferTransaction: contains the amount to transfer and the sender and receiver fantasy names, and is signed by sender.

The gaming platform may include deterministic transactions. A state transition event can trigger multiple events and transactions. Examples of transactions include:
coinbaseTransaction: awards new gaming tokens based on the aforementioned distribution algorithm. Further, this transaction can be triggered by a dataTransition "WeekOver" event;
exchangeExecution: contains fills and order status, generated by an internal matching-engine, triggered by timeTransition "TradeOpen" and followed by multiple exchangeOrder events; and
clearingTransaction: contains transferTransaction events, generated by an internal engine, triggered by a timeTransition "TradeClose" and followed by multiple exchangeExecutions.

Embodiments include crypto tokens ("BergStake") that represent a right to sign blocks in blockchains. BergStake includes hashes from a static and limited resource that are known to all nodes of the network, are perpetually attached to particular public keys, and can be lost from double mining. For example, a "slasher" algorithm could be implemented such that proof-of-double-mining will cause users to lose their BergStake.

BergStake is a generalization of proof-of-skill. For example, even when a user spends all his or her gaming tokens, the skill remains with the user and is used for signing blocks in the proof-of-skill blockchain. A private-key holder can receive BergStake proportional to tokens created by proof-of-work, pre-mine, or gaming points. BergStake remains with the private-key holder even if the new tokens are transferred away. However, BergStake can be transferred as an inheritance, for example, by providing the original private key. Thus, BergStake is a distributed consensus mechanism alternative to proof-of-work mining and solves known issues of proof-of-stake blockchains.

Since BergStake is limited and can be lost, there is in fact something at stake to deter double mining. Losing Berg-Stake is enabled by proof-of-double-mining, which results because BergStake blockchains have knowledge of alternative forks. The proof-of-double-mining can destroy Berg-Stake and its recent block reward. Hence, the risk of losing BergStake and new tokens incentivizes mining only the valid chain of a fork. This feature overcomes the "nothing-at-stake" flaw in proof-of-stake blockchains.

Since all BergStakers (i.e., owners of BergStake) are known in advance, the block-signer selection algorithm can mitigate stake grinding. For example, the hash of the previous two signers can be used to select the next signer. Another technique may involve choosing the next n signers based on the current signer and a pseudorandom number.

In some embodiments, BergStake can be used in a hybrid approach to determine signers. For example, a network can use a proof-of-work blockchain for an initial period of time, and then switch to a proof-of-stake blockchain. In the proof-of-work phase, miners can receive BergStake in addition to tokens as a reward for signing a block. A BergStake would represent the right to sign future blocks during the proof-of-stake phase. Once all tokens have been distributed, BergStakers will be rewarded with transaction fees only. As such, BergStake can be thought of as a virtual perpetual mining rig. The virtual rig is built by miners during the proof-of-work phase as they sign blocks. Those same miners can then "turn on" their BergStake virtual mining rigs to continue signing blocks in the proof-of-stake phase.

As indicated above, the disclosed technology could be implemented in a decentralized exchange. A pure decentralized exchange can be as unattainable as solving the general problems of trust and timing. Exchange limit-order-books are path dependent. As such, the time and order of events matter. In a pure decentralized distributed order book, all peers will have a different market snapshot. So, for a trader, there is no way to know the real status of his or her orders, or position, until after a block is signed. Moreover, if there were a major capitulation move followed by a snapback in price, block signers would be incentivized to front-run, and losers to attempt to extend forks.

The disclosed platform solves these drawbacks with proof-of-time provided by a centralized time-synching mechanism. Specifically, a proof-of-time consensus engine chooses a centralized time-syncing agent (e.g., a timestamping server). In some embodiments, the time-syncing agent signs each timestamp with 51% of total stake outstanding. In some embodiments, all orders (e.g., exchangeOrder events)

are timestamped by the designated time-syncing agent. The timestamped orders are then broadcast back to the network.

The disclosed platform maintains a distributed matching mechanism. A fault-tolerant, centralized matching engine is not required for processing orders and broadcasting fills and market data. Instead, the matching engines remain distributed at each node of the network, and each node has a copy of market values, including the time stamps. This equal distribution enables deterministic exchangeExecutions and clearingTransactions. Trading sessions are opened and closed by timeTransitions events and proof-of-time consensus.

Figure 2:
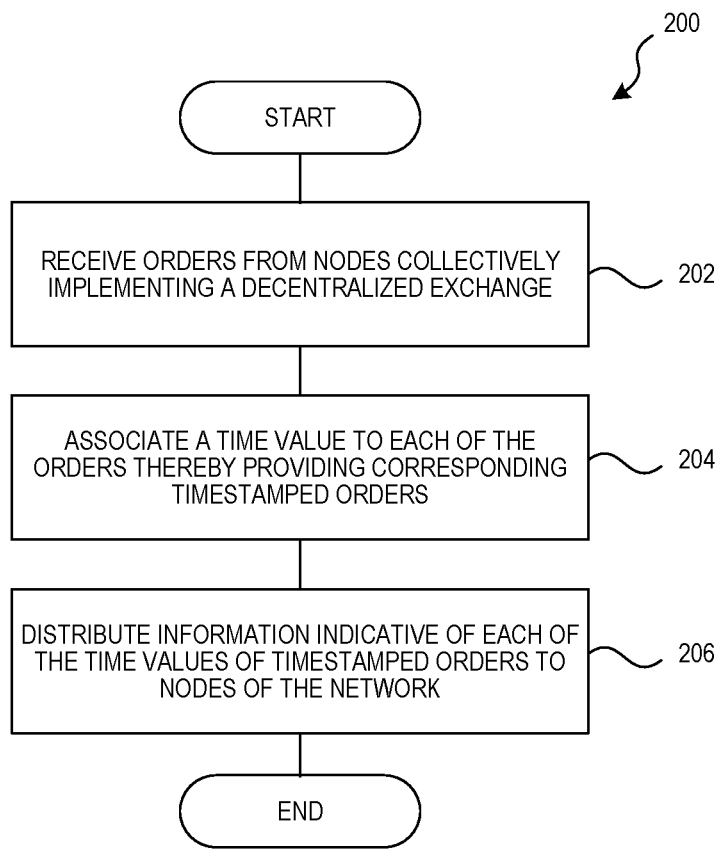
FIG. 2 is a flowchart showing a process performed by a server in a network implementing a decentralized exchange according to some embodiments of the present disclosure.

FIG. 2 is a flowchart showing a process 200 performed by a server in a network implementing a decentralized exchange according to some embodiments of the present disclosure. In step 202, the server receives a plurality of orders from a plurality of nodes collectively implementing a decentralized exchange. In step 204, the server associates a time value to each of the plurality of orders, thereby providing a corresponding plurality of time-stamped orders. In step 206, the server distributes information indicative of each of the time values of the time-stamped orders to the plurality of nodes of the network.

In some embodiments, the disclosed platform may implement a "GammaCoin" blockchain that avoids the need for time-stamping. Specifically, a bidding process among the distributed nodes of the network determines the next block signer. More specifically, nodes of the network pay to sign blocks.

In some embodiments, the highest bidder is given the right to sign blocks. Bids can be issued by nodes (e.g., vis-à-vis market participants such as traders). The value of a bid can be determined based on a variety of factors and considerations. For example, a bid could be determined by calculating a best and worst order of events. To obtain the right to sign a block, a node/trader may pay up to the amount of his or her losses (i.e., to avoid the loss) or pay up to an amount of profit (i.e., to ensure the profit). Examples of other considerations used to determine a bid include desired positions and market liquidity.

As a result, new trading strategies can emerge based on the knowledge that any of the participants of the decentralized exchange can pay to change the order of the limit-order-book. These strategies may replace high-frequency trading strategies common in centralized exchanges. In some embodiments, the decentralized exchange could be regulated by private or public agencies such as the U.S. Commodity Futures Trading Commission (CFTC).

Figure 3:
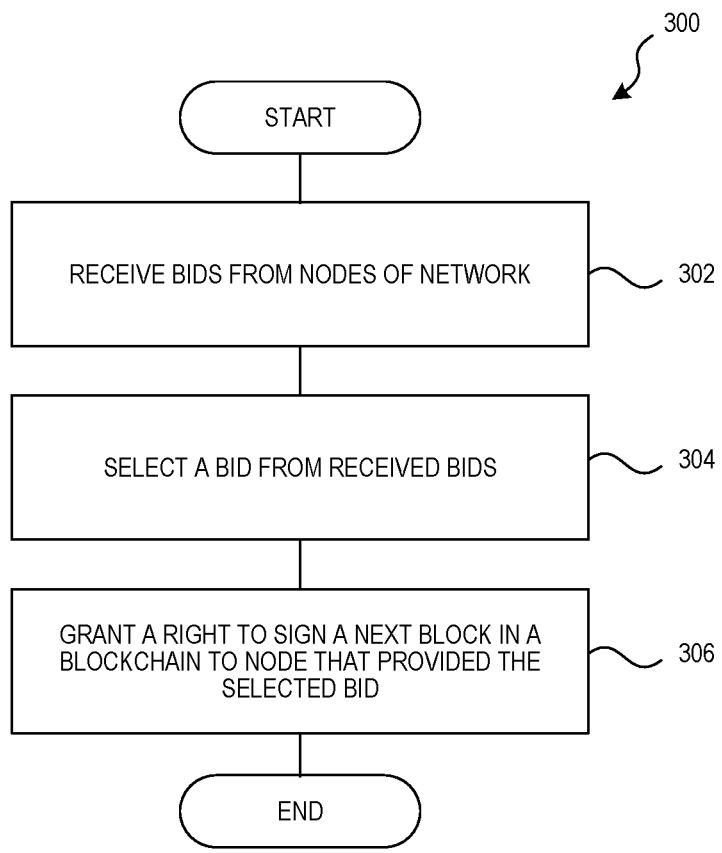
FIG. 3 is a flowchart showing a process performed by a server in a network for determining a next block signer of a blockchain according to some embodiments of the present disclosure.

For example, FIG. 3 is a flowchart showing a process 300 performed by a server in a network for determining a next block signer of a blockchain according to some embodiments of the present disclosure. In step 302, a server receives bids from nodes of the network. In step 304, the server selects a bid from the received bids. The selected bid was provided by a node from the nodes of the network. In step 306, the server grants a right to sign a next block in a blockchain to the node that provided the selected bid.

Figure 4:
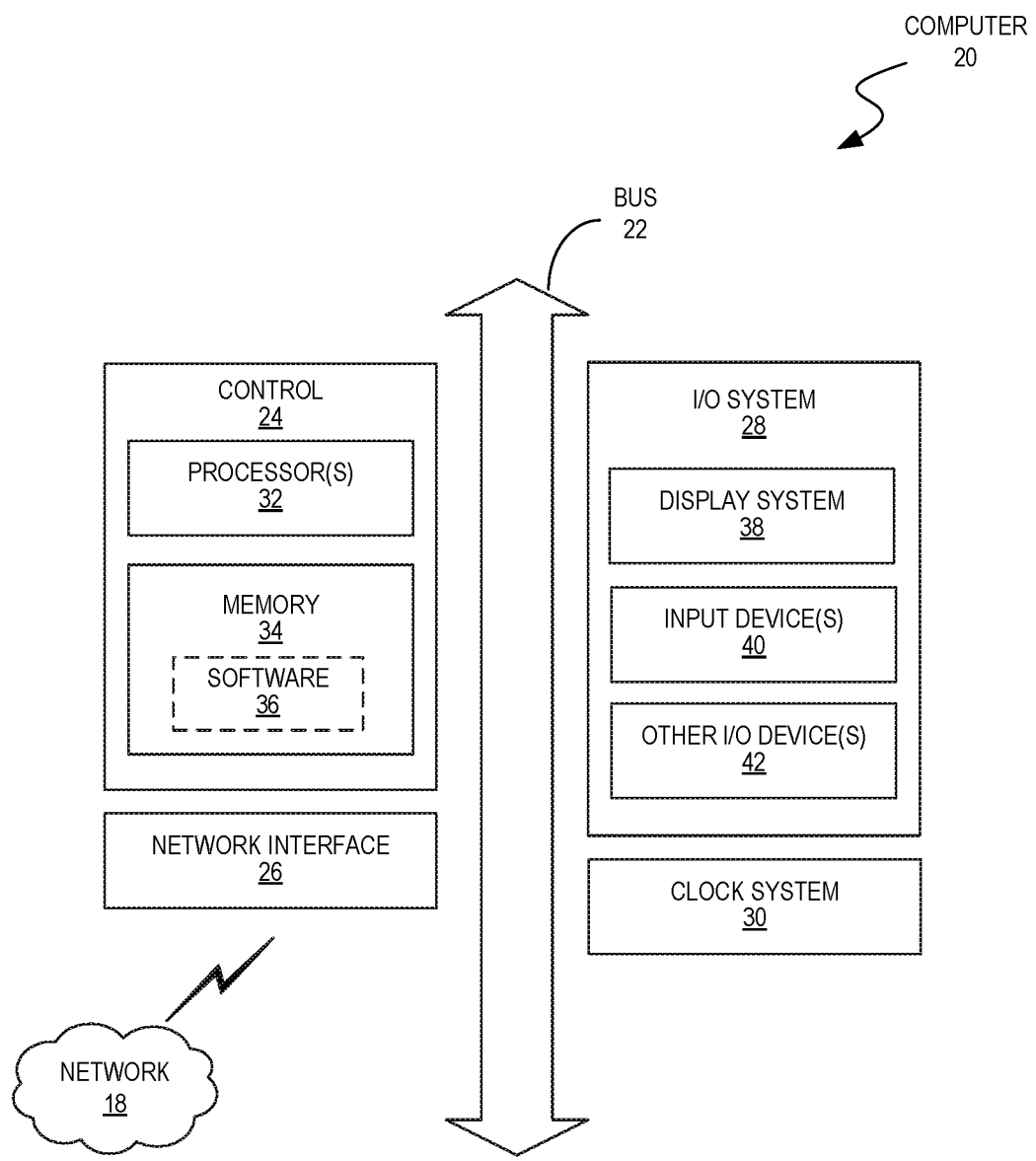
FIG. 4 is a block diagram of a computer operable to implement the disclosed technology according to some embodiments of the present disclosure.

FIG. 4 is a block diagram of a computer 20 of system 10 operable to implement the disclosed technology according to some embodiments of the present disclosure. The computer 20 may be a generic computer or specifically designed to carry out features of system 10. For example, the computer 20 may be a system-on-chip (SOC), a single-board computer (SBC) system, a desktop or laptop computer, a kiosk, a mainframe, a mesh of computer systems, a handheld mobile device, or combinations thereof.

The computer 20 may be a standalone device or part of a distributed system that spans multiple networks, locations, machines, or combinations thereof. In some embodiments, the computer 20 operates as a server computer (e.g., node 12) or a client device in a client-server network environment, or as a peer machine in a peer-to-peer system. In some embodiments, the computer 20 may perform one or more steps of the disclosed embodiments in real time, in near real time, offline, by batch processing, or combinations thereof.

As shown, the computer 20 includes a bus 22 operable to transfer data between hardware components. These components include a control 24 (i.e., processing system), a network interface 26, an Input/Output (I/O) system 28, and a clock system 30. The computer 20 may include other components not shown or further discussed for the sake of brevity. One having ordinary skill in the art will understand any hardware and software included but not shown in FIG. 4.

The control 24 includes one or more processors 32 (e.g., Central Processing Units (CPUs), Application Specific Integrated Circuits (ASICs), and/or Field Programmable Gate Arrays (FPGAs)) and memory 34 (which may include software 36). The memory 34 may include, for example, volatile memory such as random-access memory (RAM) and/or non-volatile memory such as read-only memory (ROM). The memory 34 can be local, remote, or distributed.

A software program (e.g., software 36), when referred to as "implemented in a computer-readable storage medium," includes computer-readable instructions stored in a memory (e.g., memory 34). A processor (e.g., processor 32) is "configured to execute a software program" when at least one value associated with the software program is stored in a register that is readable by the processor. In some embodiments, routines executed to implement the disclosed embodiments may be implemented as part of operating system (OS) software (e.g., Microsoft Windows®, Linux®) or a specific software application, component, program, object, module or sequence of instructions referred to as "computer programs."

As such, the computer programs typically comprise one or more instructions set at various times in various memory devices of a computer (e.g., computer 20) and which, when read and executed by at least one processor (e.g., processor 32), cause the computer to perform operations to execute features involving the various aspects of the disclosed embodiments. In some embodiments, a carrier containing the aforementioned computer program product is provided. The carrier is one of an electronic signal, an optical signal, a radio signal, or a non-transitory computer-readable storage medium (e.g., the memory 34).

The network interface 26 may include a modem or other interfaces (not shown) for coupling the computer 20 to other computers over the network 18. The I/O system 28 may operate to control various I/O devices, including peripheral devices such as a display system 38 (e.g., a monitor or touch-sensitive display) and one or more input devices 40 (e.g., a keyboard and/or pointing device). Other I/O devices 42 may include, for example, a disk drive, printer, scanner, or the like. Lastly, the clock system 30 controls a timer for use by the disclosed embodiments.

Operation of a memory device (e.g., memory 34), such as a change in state from a binary one to a binary zero (or vice versa) may comprise a visually perceptible physical transformation. The transformation may comprise a physical transformation of an article to a different state or thing. For example, a change in state may involve accumulation and storage of charge or release of stored charge. Likewise, a change of state may comprise a physical change or transformation in magnetic orientation, or a physical change or transformation in molecular structure, such as from crystalline to amorphous or vice versa.

Aspects of the disclosed embodiments may be described in terms of algorithms and symbolic representations of operations on data bits stored on memory. These algorithmic descriptions and symbolic representations generally include a sequence of operations leading to a desired result. The operations require physical manipulations of physical quantities. Usually, though not necessarily, these quantities take the form of electrical or magnetic signals capable of being stored, transferred, combined, compared, and otherwise manipulated. Customarily, and for convenience, these signals are referred to as bits, values, elements, symbols, characters, terms, numbers, or the like. These and similar terms are associated with physical quantities and are merely convenient labels applied to these quantities.

While embodiments have been described in the context of fully functioning computers, those skilled in the art will appreciate that the various embodiments are capable of being distributed as a program product in a variety of forms and that the disclosure applies equally regardless of the particular type of machine or computer-readable media used to actually effect the embodiments.

While the disclosure has been described in terms of several embodiments, those skilled in the art will recognize that the disclosure is not limited to the embodiments described herein and can be practiced with modifications and alterations within the spirit and scope of the invention. Those skilled in the art will also recognize improvements to the embodiments of the present disclosure. All such improvements are considered within the scope of the concepts disclosed herein. Thus, the description is to be regarded as illustrative instead of limiting.

The invention claimed is:

1. A computer readable medium excluding transitory signals and storing instructions that, when executed by one or more processors, cause the one or more processors to:
   receive, from a plurality of nodes of a network, a plurality of requests to sequence a plurality of transactions of one or more blocks of a blockchain network,
      wherein each request is associated with an offer to exchange a value for an exclusive right to sequence the plurality of transactions of the one or more blocks of the blockchain network;
   select a particular request from a particular node of the plurality of nodes,
      wherein the selected request is associated with a particular offer to exchange a particular value for the exclusive right to sequence the plurality of transactions in accordance with a particular sequence;
   grant, to the particular node, the exclusive right to sequence the plurality of transactions of the one or more blocks of the blockchain network in accordance with the particular sequence; and
   acknowledge that the particular value from the particular node that provided the particular request is exchanged for the exclusive right to sequence the plurality of transactions of the one or more blocks of the blockchain network in accordance with the particular sequence.

2. The computer readable medium of claim 1, wherein the one or more processors are further caused to:
   re-order the plurality of transactions of the one or more blocks of the blockchain network in accordance with the particular sequence.

3. The computer readable medium of claim 1, wherein the one or more processors are further caused to:
   order the plurality of transactions of the one or more blocks of the blockchain network in accordance with the particular sequence.

4. The computer readable medium of claim 1, wherein the one or more processors are further caused to:
   order the plurality of transactions of the one or more blocks of the blockchain network in accordance with the particular sequence; and
   store the particular sequence of the plurality of transactions as a transaction in a block of the blockchain network.

5. The computer readable medium of claim 1, wherein the one or more processors are further caused to:
   order the plurality of transactions of one or more blocks of the blockchain network in accordance with the particular sequence; and
   store the particular sequence of the plurality of transactions on a decentralized application.

6. The computer readable medium of claim 1, wherein the one or more processors are further caused to:
   store at least an indication of the sequence of the plurality of transactions on a decentralized application.

7. The computer readable medium of claim 1, wherein the plurality of transactions is received asynchronously.

8. The computer readable medium of claim 1, wherein the one or more processors implement a decentralized exchange.

9. The computer readable medium of claim 1, wherein the one or more processors simulate a centralized exchange of a high-frequency trading platform on a decentralized exchange implemented on the blockchain network.

10. The computer readable medium of claim 1, wherein the sequence of the plurality of transactions is stored in a centralized node of the network.

11. The computer readable medium of claim 1, wherein the particular value is greater than any other value of the plurality of requests.

12. The computer readable medium of claim 1, wherein the value of each request is associated with a desired order of the plurality of transactions.

13. The computer readable medium of claim 1, wherein the one or more processors are further caused to:
   grant a right to sign a block of the blockchain network to the particular node that provided the selected request.

14. The computer readable medium of claim 1, wherein each request is a bid of an auction for obtaining the exclusive right to sequence the plurality of transactions of the one or more blocks of the blockchain network.

15. The computer readable medium of claim 1, wherein each value is a payment amount such that each request is associated with an offer to exchange a payment amount for the exclusive right to sequence the plurality of transactions of the one or more blocks of the blockchain network.

16. The computer readable medium of claim 1, wherein at least an indication of the particular sequence of the plurality of transactions is stored at each node of the blockchain network.

17. The computer readable medium of claim 1, wherein the plurality of transactions is received in different orders at different nodes of the blockchain network.

18. The computer readable medium of claim 1, wherein a plurality of nodes of the blockchain network implement a matching engine to execute the plurality of transactions.

19. A method of a consensus protocol, the method comprising:

receiving, from a plurality of nodes of a network, a plurality of requests to sequence a plurality of transactions of one or more blocks of a blockchain network, wherein each request is associated with an offer to exchange a value for an exclusive right to sequence the plurality of transactions of the one or more blocks of the blockchain network, selecting a particular request from a particular node of the plurality of nodes,
wherein the selected request is associated with a particular offer to exchange a particular value for the exclusive right to sequence the plurality of transactions of the one or more blocks of the blockchain network in accordance with a particular sequence;

granting, to the particular node, the exclusive right to sequence the plurality of transactions of the one or more blocks of the blockchain network in accordance with the particular sequence; and acknowledging that the particular value from the particular node that provided the particular request is exchanged for the exclusive right to sequence the plurality of transactions of the one or more blocks of the blockchain network in accordance with the particular sequence.

20. A computer network comprising:
a processor; and
a memory storing instructions that, when executed by the processor, cause the computer network to;

receive, from a plurality of nodes of a network, a plurality of requests to sequence a plurality of transactions of one or more blocks of a blockchain network,
wherein each request is associated with an offer to exchange a value for an exclusive right to sequence the plurality of transactions of the one or more blocks of the blockchain network, select a particular request from a particular node of the plurality of nodes, wherein the selected request is associated with a particular offer to exchange a particular value for the exclusive right to sequence the plurality of transactions of the one or more blocks of the blockchain network in accordance with a particular sequence;

grant, to the particular node, the exclusive right to sequence the plurality of transactions of the one or more blocks of the blockchain network in accordance with the particular sequence; and acknowledge that the particular value from the particular node that provided the particular request is exchanged for the exclusive right to sequence the plurality of transactions of the one or more blocks of the blockchain network in accordance with the particular sequence.

* * * * *